United States Patent [19]

Guritz et al.

[11] 4,323,949
[45] Apr. 6, 1982

[54] SERVICE CABLE DISTRIBUTION SYSTEM

[76] Inventors: Kenneth E. Guritz, 570 Emerald Harbor Dr., Longboat Key, Fla. 33548; Michael L. Guritz, 6904 Manatee Ave. W., Bradenton, Fla. 33508

[21] Appl. No.: 147,742

[22] Filed: May 8, 1980

[51] Int. Cl.³ .............................................. H02B 1/20
[52] U.S. Cl. .................................... 361/428; 174/48; 361/332
[58] Field of Search ............. 200/51 R; 361/331, 332, 361/334, 356, 357, 376, 378, 428; 174/48, 49; 307/112, 113, 126

[56] References Cited

U.S. PATENT DOCUMENTS

| 2,321,568 | 6/1943 | Wilson | 174/49 |
| 3,715,627 | 2/1973 | D'Ausilio | 174/48 |
| 3,793,793 | 2/1974 | Dobbins | 174/49 |
| 3,973,818 | 8/1976 | Soquenne | 361/356 |

FOREIGN PATENT DOCUMENTS 489465  1/1953  Canada ................... 174/49

Primary Examiner—Gerald P. Tolin
Attorney, Agent, or Firm—Arthur W. Fisher, III

[57] ABSTRACT

A service cable distribution system of the type designed to be embedded in poured concrete flooring and specifically designed to provide for the placement and supply of power and low tension service cables over a given service area over or in the formed floor. Independent and interiorly segregated supply channels extend from a central power closet or supply area along predetermined extensions and are further disposed in interconnected relation with a plurality of aligned junction box assemblies. Circuit breaker facilities are installed in each of the junction box assemblies housing the power cable wherein the circuit breaker serves to electrically interconnect the power cables extending along the main supply line with those extending along a plurality of individual distribution lines through distribution channels. Only the supply channels housing power cables as distinguished from low tension cables are specifically structured to meet UL standards since segregation of the power cables and low tension cables is clearly established. A second supply channel assembly comprises a plurality and at least a first and second low tension cable channel which interconnects the low tension cables between a first predetermined number of the plurality of junction boxes wherein the second low tension cable channel extends in by-passed relation to these first predetermined number of junction boxes and is interconnected with a second predetermined number of junction boxes. Each of the box components respectively communicate with the interior of the power cable channel and the low tension cable channel so as to estabish access and interconnection with the cable therein and the distribution cables extending to each of the service outlets over the predetermined service area.

11 Claims, 4 Drawing Figures

SERVICE CABLE DISTRIBUTION SYSTEM

BACKGROUND OF THE INVENTION

1. Field of the Invention

A service cable distribution system of the type used for the placement and supply of power cables as well as low tension cables over a predetermined service area wherein the distribution system is of the type embedded and pre-laid into a poured concrete floor in a manner to allow access to specific electrical interconnections between supply channels and distribution channels extending over the service area.

2. Description of the Prior Art

In relatively modern multi floor building construction the use of poured concrete floors having service cable distribution assemblies embedded therein have enjoyed wide popularity. In such distribution assemblies there is normally a central "power closet" or control area serving as a central power distribution or terminal location facility. One or more power cable and low tension cable ducts serving as major supply lines are extended outwardly from this control area in various patterns to supply power and low tension service cables to a predetermined service area. In addition a number of spaced apart distribution lines extend away from, in substantially spaced apart relation from the supply line so as to dispose or arrange for placement of the various service cables to the individual service outlets which supply such power and lower tension services over a given service area. Present day distribution systems normally utilize rather expensive trench header duct which serves as the main supply duct from the control area to the various distribution lines. The expense of such trench header duct is very great due to the fact that a large capacity for interior must be required to carry both the power cable and more bulky and volume consuming low tension cable.

In accordance with UL standards any duct or conduit system housing power cables for the distribution of electrical power must meet certain structural standards such as being made from 14 gage steel, etc. Conventional trench header duct does not separate the power cable duct from the low tension cable duct. Accordingly, the entire structure must be made in accordance with UL standards since in fact high tension or power cable is being maintained therein. To the contrary, low tension duct cable of the type used to supply telephone and intercommunication services throughout a given service area, because of its low tension characteristics does not require the meeting of UL standards. Therefore it is possible for such ducting or conduits to be made and constructed much more cheaply. Further it is normally the practice in positioning or disposing such service cable to cause the physical pulling through of all service cable required from the control area down the trench header duct and completely through the various distribution lines wherein the service cable is pulled through as a single integrally extended line. UL standards again require specific interconnection or splicing between the distribution lines and the supply lines extending from the control area.

The conventional practice of pulling the service cables from the power closet or control area to the distribution ducts via the supply ducts results in a system wherein the circuit breakers for the system are all disposed in the power closet. The inability of the conventional systems to provide means for taking the circuit breakers out of the control area reduces the flexibility of such systems and greatly increases their costs.

The entire system as well as the individual ducting normally required is extremely costly, expensive and often times very inconvenient. Such inconvenience is frequently caused by the disruption of the existing activity being conducted on a given floor and also the temporary destruction and required repair of the existing floor area.

Therefore, a need has been identified in the construction industry for an electrical and service cable distribution system which is capable of low cost installation, adequate access to the service cables and which simplifies the supplying and positioning of service cables from the control area, along the supply route and through the individual distribution lines in an easy manner which will not disrupt the surrounding business activities normally occuring in the serviced area.

The needed system would provide a means for removing the circuit breakers from the control area and provide housing means for said circuit breakers so that they could be disposed at intervals along the supply line. Such housing means should further provide junction box means that would not only house the circuit breakers but would further provide a location for the interconnection of supply and distribution lines. Further, the needed system would provide a layout scheme whereby minimum amounts of space would be filled by the service cable system while simultaneously providing adequate capacity for the bulky low tension cables that form a part of the service system. Accordingly, the new service cable distribution system should provide a novel type of junction box that not only houses circuit breakers, provides an interconnection point for supply and distribution lines, but also is specifically structured and disposed to provide a novel layout scheme that provides adequate accommodation for both high and low tension cables.

SUMMARY OF THE INVENTION

This invention is directed towards a power cable and low tension cable distribution assembly of the type normally embedded in poured concrete flooring so as to distribute the aforementioned service cables from a central control area or terminal, "power closet" to the various service outlets distributed over the service area.

The distribution system comprises supply channel means including a first channel assembly and a second channel assembly extending in a predetermined extension and for a predetermined length from the central control area or "power closet" outwardly over a predetermined area to be serviced by the cables. The first supply channel assembly comprises at least one power cable channel extending outwardly from the control area and interconnected at spaced intervals to a plurality of junction box means. Each of the junction box means are disposed in aligned relation to one another and specifically positioned to establish interconnection between service cables extending from the control area to the individual junction box means and between the service cables extending outwardly from the junction box means therefrom to the individual service outlets. These latter service cables define distribution lines as distinguished from the main supply lines and are housed in distribution channel means.

Accordingly, one embodiment of the present invention differs from current existing distribution systems by establishing a direct interconnection between the service cables in the supply channel means and the service cables extending from the junction boxes to the service outlets in the distribution channel means. More specifically with regard to interconnection of the power cables existing in the supply channel and those existing or housed in the distribution channel, UL standards are met by defining a direct electrical interconnection through a circuit breaker means housed specifically in the various junction box means. In addition, each of the cables can be pre-laid in the various channels, both supply channels and distribution channels, prior to the pouring or permanently affixing the cement floor over the channel systems defining the distribution system.

A specific system and structural feature of the present invention comprises the housing of power cables and the low tension cables in segregated relation. This is accomplished by having the first channel assembly defined as at least one power cable channel specifically structured to meet UL standards and extending outwardly from the control area to a plurality of junction boxes in interconnected fashion thereto. As will be explained in greater detail the junction box means are each, at least in part, disposed in interior communication with the power cable channel so as to establish and provide access to direct electrical interconnection, through the provision of the aforementioned circuit breaker means, with the power cable extending from the junction box to the various service outlets as being housed in the distribution channel means.

The low tension cable is positioned and/or housed in a plurality of separate low tension cable channels also extending outwardly from the control area along the supply line and in substantially adjacent, parallel extension with the power cable channel. In that the low tension cables are generally considered more bulky and accordingly require more internal room for their housing and placement, a plurality of such low tension cable channels are provided along the entire supply line. Therefore, a first low tension cable channel extends from the control area into interconnecting relation with each of the first predetermined number of junction box means. When the capacity of such service cables so disposed in the first low tension cable channel is utilized, a second low tension cable channel is provided extending from the control area, in by-passed relation to these first predetermined number of junction box means and disposed in interconnecting relation with a second predetermined number of junction box means disposed in aligned, spaced relation thereafter. Succeeding low tension channels are also provided and disposed in spaced apart or by-passed relation to each group of predetermined number of the junction box means for interconnection with a next predetermined number or group of the plurality of junction box means to service a predetermined or designated area. It should be further noted that a practical advantage may be inherently incorporated in such system in that each of the low tension cable channel, being segregated from the power cable channels, may be structured of any, less expensive material which is not required to meet UL standards. Such material may include plastic, fiberglass, or any material capable of creating proper housing.

Other structural features of the present invention include the junction box means comprising at least a first box component and a second box component. The first box component is specifically designed to have a first passage formed therein disposed in communicating, in line relation with a first passage formed in the second box component. Such first and second box components are disposed in side-by-side relation and each, due to the aligned relation of the respective first passages are designed to allow passage of the power cable channel therethrough and in communication with both. More specifically the structure of the first box component is such as to establish interior communication between that of the first box component and the power cable channel. This interior communication and other structural features of the junction box means allows access to the interior of the power cable channel through the junction box means and access thereto to the circuit breaker interconnection between the power cable in the supply channel and the power cable in the distribution channel.

Accordingly, the circuit breaker means is mounted and disposed in electrical interconnection with respective power cable extending through the supply channel and the distribution channel as set forth above.

The second box component of the junction box means is specifically structured to have a longer configuration so as to allow a portion thereof to extend out beyond the distal end of the first box component. In such configuration, the second box component has a secnd passage formed therein for reception of the low tension cable channel. This configuration allows reception of the low tension cable from the next previous junction box means or alternately as the first point of interconnection of a newly "strung" or beginning low tension cable.

Access means in the form of an access aperture is provided in each of the first and second box components to provide access to the interior thereof and in turn access to the various power cable channel or low tension channels with which they are connected.

The proximate end of each first and second box component is specifically configured for interconnection with the distribution channel means such that proper interconnection can occur between the respective power cables and low tension cables in the respective supply channel means and distribution channel means.

Importantly, each junction box is specifically structured to house a circuit breaker means therein. This allows power take off or "pigtail" means to interconnect the power cables in the supply channel means and the power cables in the distribution channel means. This obviates the need to pull power cables from the control area, through the supply channel and through the distribution channel in sequence. Several other synergistic effects are also manifested, including the provision of a novel design scheme for the entire service cable system, made possible by having circuit breakers distributed in the concrete floor instead of in the control area.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar part throughout the several views of the drawings.

DETAILED DESCRIPTION OF THE PREFERRED EMBODIMENT

Figure 1:
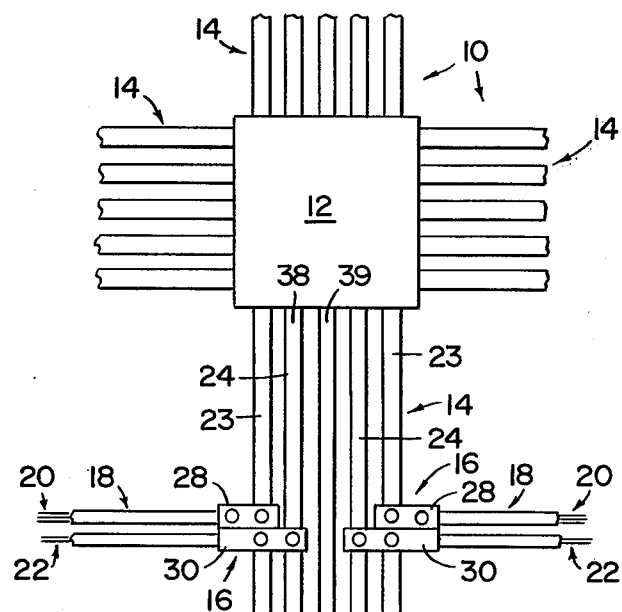
FIG. 1 is a schematic view of the distribution assembly of the present invention with cooperatively positioned junction box assembly.

This invention relates to a power and/or service cable distribution system generally indicated in FIG. 1 as 10 of the type at least partially incorporating a central control area or power closet 12 from which both the power cables and low tension service cables originate in the same plane.

The term "partially" is here employed to indicate that conventional power closets house circuit breaker assemblies, whereas an important feature of this invention lies in the removal of such circuit breakers from the power closet and the placement of such circuit breakers in the poured concrete floor at predetermined locations.

As set forth above the supply channels 14 comprise specifically structured ducting extending from the control area or power closet 12 along specific paths to junction box assemblies generally indicated as 16. Distribution channel means generally indicated as 18 serves to house both the distribution power lines 20 and the distribution low tension lines 22 as they are extended from the junction box assembly 16 to the individual power or service outlets over the floor or service area (not shown).

More specifically the supply channel means 14 comprises at least a first supply channel assembly 23 and a second supply channel assembly 24. The first channel assembly 23 (FIG. 3) is specifically structured and designed to meet U.L. requirements in that it houses power cables 25 which, in the preferred embodiment, are at least three in number. By virtue of the housing of power cable 25 the first supply channel assembly 23 is structured from at least 14 gage metal and is thereby more expensive as set forth above. The first supply channel assembly 23 extends in a substantially linear path from the main control area 12 or power closet outwardly to the individual junction boxes assembly 16 as shown in FIG. 1.

It should be here noted that the channel 23, since it need carry only three power cables 25 (hot, neutral and ground) need not be large. A commercial embodiment of the invention contemplates the provision of a power channel 23 having a width dimension of about two inches and having a height dimension of about three-quarter inch. This will easily accommodate the three power cables which normally are "0" gage. Further, it should now be noted that channel 23 will rest on a support surface (not shown) when the inventive service cable system is installed. This support surface comprises the floor or bottom of a trench formed by the general contractor when the concrete floor in which the service cable system will be embedded is poured.

In contrast the second channel assembly 24 is specifically designed and structured to house low tension cables 27. The disposition of the first supply channel assembly 23 and the second supply channel assembly 24 is to maintain the power cable 25 and the low tension service cables 27 in a totally segregated relation to one another. However, the disposition of both the power 25 cables and the low tension cables 27 extend from the primary control area 12 or power closet outwardly therefrom into communicating relation with each of the junction box assembly 16. By virtue of the existence of less strict requirements of channel or ducting housing low tension cables 27, the second supply channel assembly 24 may be structured of fiberglass, heavy gaged plastic, or cheaper material which is easier to handle since it is totally segregated from the high tension power cables 25.

Figure 2:
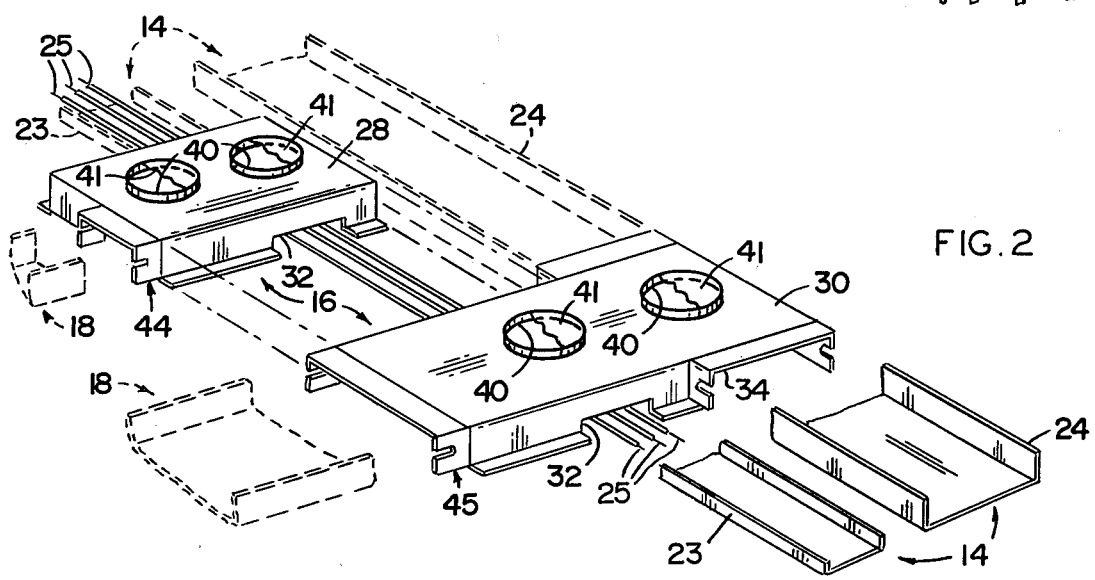
FIG. 2 is an exploded view of the junction box assembly relative to the supply channels and distribution channels.

With regard to the junction box assemblies as shown in FIGS. 1 and 2, each junction box assembly comprises a first box component 28 and a second box component 30. Both the first and second box component 28 and 30 include a first passage 32 extending completely therethrough and specifically disposed and structured to allow passage therethrough of the first supply channel assembly 23. This specific structure allows inner communication between the interior of the first supply channel assembly 23 and each of the junction boxes 28 and 30.

In addition the second box component 30 comprises a second passage 34 specifically disposed and structured to allow passage therethrough only of the second supply channel assembly 24. Again interior access is provided between the second box component 30 and the second supply channel assembly 24. It is obvious through a 27 of both FIGS. 1 and 2 that the longitudinal dimension of the second box component is preferably made somewhat greater than that of the first box component 28 so as to extend outwardly from the distal end thereof. With reference to FIG. 1 this is specifically structured so that the second supply channel assembly 24 may comprise a plurality of channels including at least a first and second low tension cable channels 24 and 39 respectively. The purpose of supplying more than one low tension cable channel is due to the relatively greater bulk of the low tension cables which have a tendency to fill the capacity of the second supply channel assembly 24. Accordingly, in actual installation the first low tension cable channel 24 extends outwardly from the power closet 12 to a first predetermined number of junction box assemblies 16 in a particular second box components 30. Accordingly, when the capacity of a first low tension cable channel 24 has been filled, a second low tension cable channel is merely run from the power closet 12 outwardly to the next available junction box assembly 16' not yet serviced by a low tension cable channel as shown in FIG. 1. This ability to run a plurality of low tension cable channels independently to the first supply channel 23 housing power cables reduces the expense greatly and adds to the versatility of the overall distribution system as is evident to one familar with the industry.

Figure 3:
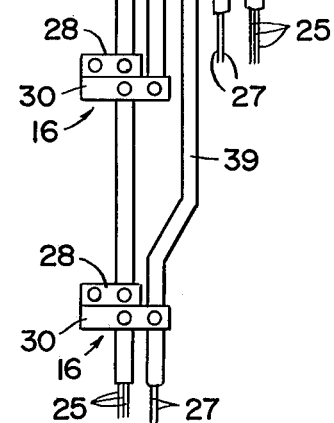
FIG. 3 is a detailed view in partial cutaway showing interconnection between the power cables and the circuit breaker assembly.
Figure 3:
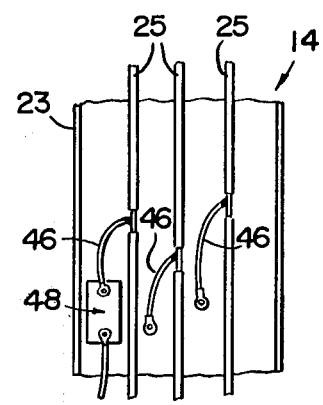

A commercial embodiment of the supply channel 24 has a width dimension of approximately 10 inches and a height dimension of approximately two inches. Like its companion, the supply channel 23 (carrying the high tension cables, as aforesaid), this low tension channel 24 rests upon and is supported by the floor of a trench formed in the poured concrete floor by the general contractor. The channels 23 and 24 lie in the same trench, in side by side relation. It will be observed, by reference to FIG. 3, that the height dimension of the junction box components 28 and 30 is substantially higher than the height dimension of either channel 23 or 24. Specifically, a commercial embodiment of the invention contemplates the provision of junction boxes having a height dimension of about three inches. Accordingly, the low tension cables 27 pass upwardly and thus outwardly of the channel 24 and hence over the power cables 25 lying in the bottom of channel 23 when such low tension cables 27 are bent to lead from the supply channel 24 to a distribution channel, as shown in FIG. 3. Not only does the preferred depth for the junction boxes 28, 30 of about three inches provide space to allow the crossover of the low tension cables 27, but such depth further provides adequate space to admit a circuit breaker means 48, as shown in FIG. 3 thereinto. With the circuit breaker means 48 disposed in the junction box 28, resting on the same support surface as the channels 23 and 24, interconnection between the power cables 25 and the supply channel and distribution channel can easily be made within each junction box 28.

Other structural features of the present invention comprises each box component 28 and 30 having an integrally formed access aperture 40 provided with a removable lid means 41 so as to provide access from above the poured concrete floor surface down into the interior of the box components 28 and 30 and into the interior of the supply and distribution channels as set forth above. This allows for servicing or the aforesaid inter connection of the power cables 25 in the supply and distribution channels, and allows manipulation of the low tension cables 27, i.e., bending the cables 27 as aforesaid to lead them from a supply channel to a specific distribution channel 18.

Furthermore, each of the box components 28 and 30 includes connecting facilities as at 44 and 45 respectively serving to interconnect the various distribution channels assemblies 18 as shown in phantom lines in FIG. 2.

Figure 4:
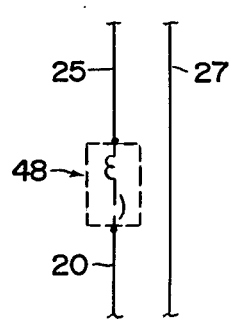
FIG. 4 is a schematic view in circuit diagram form of the circuit breaker assembly designed to interconnect the distribution lines with the power lines as represented in the embodiment of FIG. 3.

With regard to FIGS. 3 and 4, "pigtail" or power take off connections 46 are disposed to allow interconnection with each of the preferred three power cables 25 with the circuit breaker assembly generally indicated as 48 (FIGS. 3 and 4). The circuit breaker assembly may be mounted on the interior of the first box component 28 so as to establish inter connection between the power supply line 25 and the power distribution line 20 as set forth. The provision of the circuit breaker assembly 48 is to meet present U.L. requirements in establishing proper interconnection to eliminate any direct splicing connections, and to indeed allow, as aforesaid, the unique design scheme herein disclosed.

It will thus be seen that the objects set forth above, and those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A service cable distribution system of the type used for placement and supply of power and low tension service cables over a floor surface area, said distribution system comprising: supply channel means comprising a first channel assembly disposed between a control area and a junction box assembly, said first channel assembly structured and dimensioned to house power cable and a second channel assembly disposed between the control area and said junction box assembly in spaced, segregated relation to the interior of said first channel assembly, said second channel assembly structured for housing of low tension cables independent of power cable, distribution channel means interconnected in direct communicating relation to said supply channel means via said junction box assembly, circuit breaker means and operatively disposed within said junction box assembly and disposed for electrical interconnection between power cables within said first channel assembly and power cables within said distribution channel means, said distribution channel means disposed and structured for housing power cables and low tension cables therein and for disposing the service cables in electrically interconnected relation with service cables within said supply channel means via said circuit breaker means, said junction box assembly comprises a plurality of junction box means disposed in aligned spaced apart relation to one another, each of said junction box means disposed in interconnected, communicating relation between said supply channel means and at least one of a plurality of distribution channels defining said distribution channel means, said first channel assembly comprises a power cable channel extending outwardly from the control area a distance sufficient to supply power over a predetermined service area, said power cable channel interconnected to each of said plurality of junction box means in substantially aligned, spaced apart relation to one another, each of said junction box means structured for direct communication with power cables within said first channel assembly and interconnected with one of a plurality of distribution channels, said second channel assembly comprises at least a first low tension cable channel extending outwardly from the control area and disposed in interconnected relation with a first predetermined number of said plurality of junction box means, said second channel assembly comprising at least a second low tension cable channel disposed to extend outwardly from the control area and into interconnected, communicating relation with a second predetermined number of said plurality of junction box means.

2. A distribution system as in claim 1 wherein both said first and second predetermined number of junction box means are each interconnected in communicating relation with said power cable channel and one of said distribution channels of said distribution channel means; said second low tension cable disposed to extend in non-connected, by-pass relation to said first predetermined number of junction box means.

3. A distribution system as in claim 1 wherein said junction box means comprises a first and secnd box component, said first box component disposed in interconnected communicating relation with said power cable channel and said one distribution channel defining said distribution channel means, said first box component structured and configured to establish communicating relation between the interior of said one distribution channel and said power cable channel, said second box component interconnected to said power cable channel and in attached intercommunicating relation with said second channel assembly and attached to said distribution channel means so as to establish interior communication between the interiors of said distribution channel means and said second channel assembly.

4. A distribution system as in claim 3 wherein said first and second box components are disposed in substantially adjacent side-by-side relation to one another, and disposed to have said power cable channel pass through both thereof and in interior communication with at least said first box component.

5. A distribution system as in claim 4 wherein said second box component comprises a longitudinal dimension greater than that of said first box component and extending there beyond, both said first and second box component comprising at least one channel passage means disposed in substantially aligned communicating relation with one another, said one channel passage means of each box component configured to allow passage of said power cable channel through both said first and second box components.

6. A distribution system as in claim 5 wherein said second box component comprises a second channel passage formed therein in communicating relation with either at least said first and second low tension cable channel, said second channel passage formed in said second box component portion extending outwardly from said first box component so as to dispose said first or second low tension cable channel located therein in substantially side-by-side relation with said power cable channel extending through said first passage means of both said first and second component.

7. A distribution system as in claim 6 wherein said distribution channel means is interconnected to both said first and second junction box in interior communication with both said first and second cable assemblies passing through said one passage means and said second passage of said respective box components.

8. A distribution system as in claim 1 further comprising access means including at least one aperture formed in each of said first and second box component and disposed in accessable relation to the floor surface in which said components are mounted and to the respective interiors of said first and second box components.

9. A distribution system as in claim 8 wherein said circuit breaker means is mounted on the interior of said first box component and positioned in accessable relation through said access means.

10. A distribution system as in claim 1 wherein each of said plurality of junction box means houses one of said circuit breaker means.

11. A distribution system as in claim 1, wherein each of said first box components of said plurality of junction box means houses a circuit breaker means.

* * * * *